US008415577B2

(12) United States Patent
Garcia et al.

(10) Patent No.: US 8,415,577 B2
(45) Date of Patent: Apr. 9, 2013

(54) ASSEMBLY FOR INCREASING TORQUE TACTILITY OF A ROTARY CONTROL FOR A HANDHELD RADIO

(75) Inventors: Jorge L. Garcia, Plantation, FL (US); Anthony M. Kakiel, Coral Springs, FL (US); Adrian F. Rubio, Fort Lauderdale, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 377 days.

(21) Appl. No.: 12/818,885

(22) Filed: Jun. 18, 2010

(65) Prior Publication Data

US 2011/0308923 A1 Dec. 22, 2011

(51) Int. Cl.
*H01H 19/11* (2006.01)
*H01H 19/14* (2006.01)

(52) U.S. Cl. ........ 200/564; 200/565; 200/296; 200/330; 200/336

(58) Field of Classification Search .......... 200/564–571, 200/296, 330, 331, 336; 341/20, 22, 27, 341/35; 345/156, 168, 169, 184; 455/90.1–90.3, 455/170.1, 178.1, 171.1, 347, 348, 351, 354, 455/95, 550.1, 557, 560, 575; 192/46; 464/37
See application file for complete search history.

(56) References Cited

U.S. PATENT DOCUMENTS

| | | | |
|---|---|---|---|
| 3,333,079 A * | 7/1967 | Michaelson, Jr. ............ 200/336 |
| 3,662,618 A * | 5/1972 | Kroll et al. ...................... 74/527 |
| 3,754,106 A | 8/1973 | MacDonald |
| 4,035,759 A * | 7/1977 | Van Benthuysen ........... 338/162 |
| 4,993,280 A * | 2/1991 | Olkoski et al. .................. 74/553 |
| 5,159,706 A * | 10/1992 | Hodsdon ...................... 455/90.3 |
| 5,784,688 A * | 7/1998 | Siddoway .................... 455/90.3 |
| 6,058,296 A * | 5/2000 | Lian et al. .................. 455/170.1 |
| 6,307,304 B1 | 10/2001 | Yorio et al. |
| 7,592,562 B1 * | 9/2009 | Vanderwege et al. ......... 200/336 |
| 7,599,708 B2 | 10/2009 | Garcia et al. |
| 7,834,865 B2 * | 11/2010 | Jannasch et al. .............. 345/184 |

(Continued)

OTHER PUBLICATIONS

Snap Action Rotary Switch Adapter, Jun. 1973, IBM Technical Disclosure Bulletin, vol. No. 16, issue No. 1, p. No. 55, an adapter connected between an operating knob and the shaft of a commercial rotary switch for the purpose of creating a snap action between operating positions.*

(Continued)

*Primary Examiner* — Michael Friedhofer
(74) *Attorney, Agent, or Firm* — Barbara R. Doutre

(57) ABSTRACT

A rotary control assembly (200) for a handheld two-way radio (100) provides improved tactile feedback in the form of clicks, even during gloved usage. Assembly (200) includes a housing having a large control knob (108), a rotary switch control (202) having a shaft (204), a shaft extender (206) having a toothed gear element (210), and a ball plunger (302). As the control knob (108) is rotated, the shaft extender (206), toothed gear element (210) and shaft (204), all turn in cooperation. The toothed gear element (210) is loaded by the ball plunger thereby generating a clicking tactile feedback in response to the control knob (108) being rotated. A large control knob (108), suitable for a ruggedized environment, can thus be used in conjunction with a small rotary switch control (202) for improved tactile feedback while maximizing internal space efficiency.

16 Claims, 5 Drawing Sheets

U.S. PATENT DOCUMENTS

| | | | |
|---|---|---|---|
| 2005/0184595 A1 | 8/2005 | Foster et al. | |
| 2006/0082554 A1 | 4/2006 | Caine et al. | |
| 2006/0258404 A1 | 11/2006 | Arneson et al. | |
| 2007/0013368 A1 | 1/2007 | Garcia et al. | |
| 2008/0236329 A1* | 10/2008 | Slavin et al. | 74/553 |
| 2009/0038921 A1* | 2/2009 | Kaps et al. | 200/336 |
| 2010/0125393 A1 | 5/2010 | Jarvinen et al. | |
| 2010/0140059 A1 | 6/2010 | Kagami et al. | |
| 2011/0281533 A1* | 11/2011 | Deleus et al. | 455/90.2 |

OTHER PUBLICATIONS http://www.alps.com/WebObjects/catalog.woa/E/HTML/Switch/Rotary/SRBM/SRBM120700.html—ALPS Manufacturer of Electronic Components—Rotary Switch—Details-Specification—Copyright 1995-2010—6 pages.

International Search Report and Written Opinion mailed on Oct. 5, 2011 for International Application No. PCT/US2011/038835.

* cited by examiner

US 8,415,577 B2

ASSEMBLY FOR INCREASING TORQUE TACTILITY OF A ROTARY CONTROL FOR A HANDHELD RADIO

FIELD OF THE DISCLOSURE

The present disclosure relates generally to handheld two-way radios and more particularly to rotary controls for such radios.

BACKGROUND

Handheld two-way radio users are familiar and accustomed to rotary controls. Such controls on a radio can include for example volume control, channel selection, and squelch control among others. A rotary control for a two-way radio must have sufficient turning torque to prevent inadvertent actuation of the control. In certain environments, such as public safety environments, users for example firefighters and rescue personnel are often wearing gloves. Handheld radios developed for use in these conditions often provide a wider diameter rotary control—considered to be a more "glovable" control. However, inadvertent or unintentional actuation can become problematic with larger diameter, glovable controls.

To minimize inadvertent actuation of a rotary control, the torque may increased by adding friction, for example via an o-ring. Unfortunately, approaches which increase friction can often "mute" the tactile feedback to the user. The tactile feedback of a rotary control may take the form of a clicking feel for the multiple positions of the rotary control. Muting the clicks of the rotary control makes it more difficult for the user to manage the control.

The torque of a rotary control can also be increased by using a significantly larger switch with larger torque. Since products are generally decreasing in size, traditional rotary controls tend to be mounted in close proximity to other controls on a given product. As such, larger switches are not feasible when dealing with small, volume constrained portable devices, such as handheld two-way radios. The grip area accessible by users for these rotary controls traditionally extends to the control surface of a product.

Accordingly, there is a need for increasing the switching torque of a small sized rotary control, without muting tactile feedback particularly in the form of clicks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
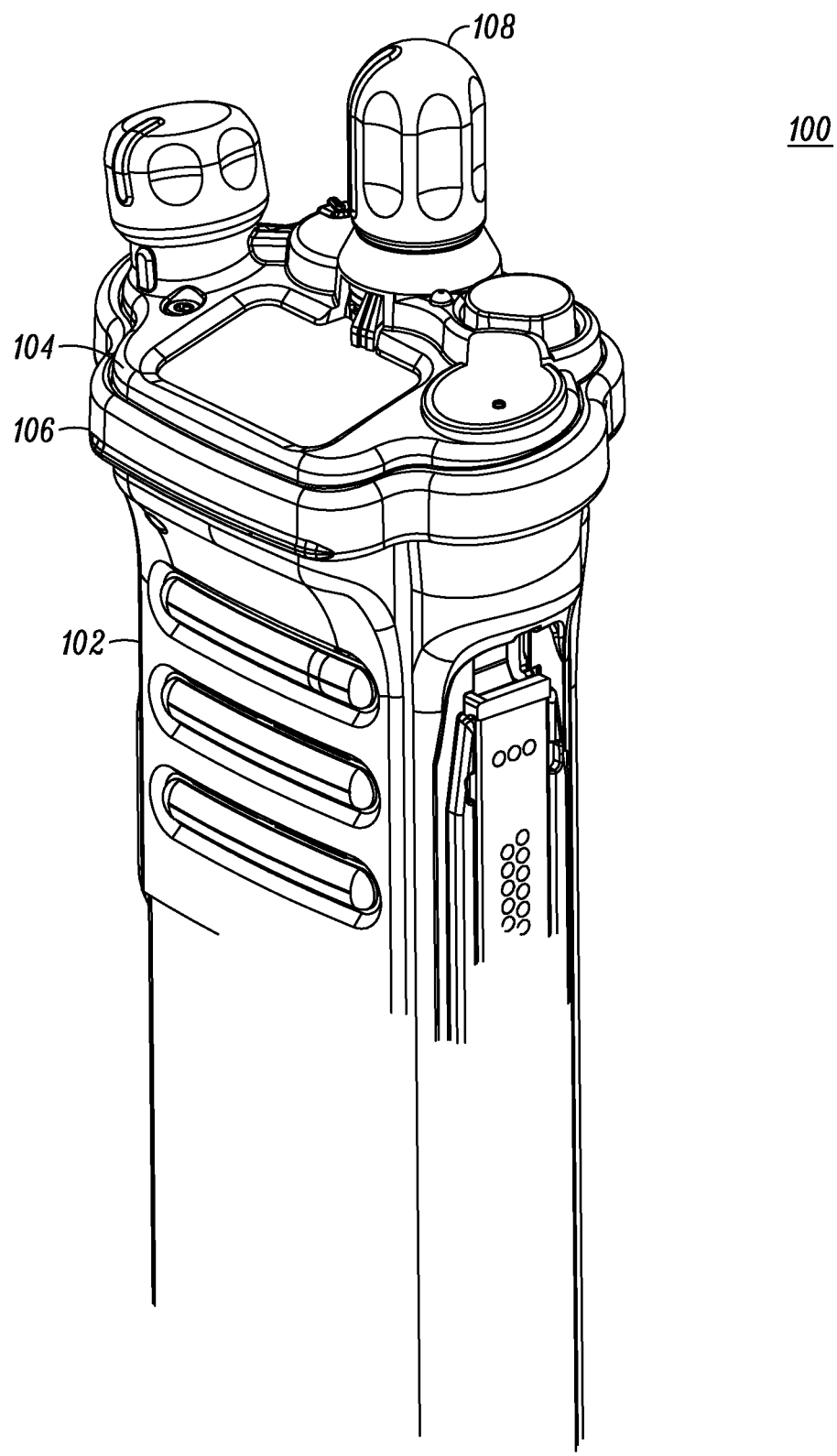
FIG. 1 illustrates a handheld radio having rotary control in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein an assembly for increasing torque tactility of a rotary control for a handheld radio. The assembly utilizes a combination of housing with molded apertures upon which is coupled a control knob suitably large for gloved use. A small off-the-shelf rotary switch control is recessed within the housing. Within the molded apertures of the housing and control knob are situated and operatively coupled a shaft extender having a toothed gear element in conjunction with a ball plunger which enable increased torque tacitly to the end user in response to the control knob being rotated.

FIG. 1 is a perspective view of a two-way handheld radio 100 having a main housing portion 102 and first and second top housing portions in the form of a top bezel 104 and a bottom bezel 106 respectively. A rotary control knob 108 is mounted to a top bezel 104, preferably operating as a frequency control knob. Other radio controls, such as a display, push-to-talk (PTT) button, speaker grill and additional top mounted controls are also shown, but not described, to illustrate the generally crowded radio control environment in which the control knob 108 needs to operate. The handheld radio 100 provides increased torque tactility at control knob 108. Obtaining a high rotational torque in rotary control switches has been a significant problem in the handheld radio market, especially given the size constraints of these devices. The rotary control assembly formed in accordance with the various embodiments to be described herein provides significant advantages over a standard rotary assembly by maximizing space efficiency. In accordance with an embodiment of the invention, the handheld radio 100 is a ruggedized radio in which control knob 108 is of a size similar to that used in a mobile or vehicular radio environment which provides improved tactile feedback in the form of clicks even during gloved usage.

Figure 2:
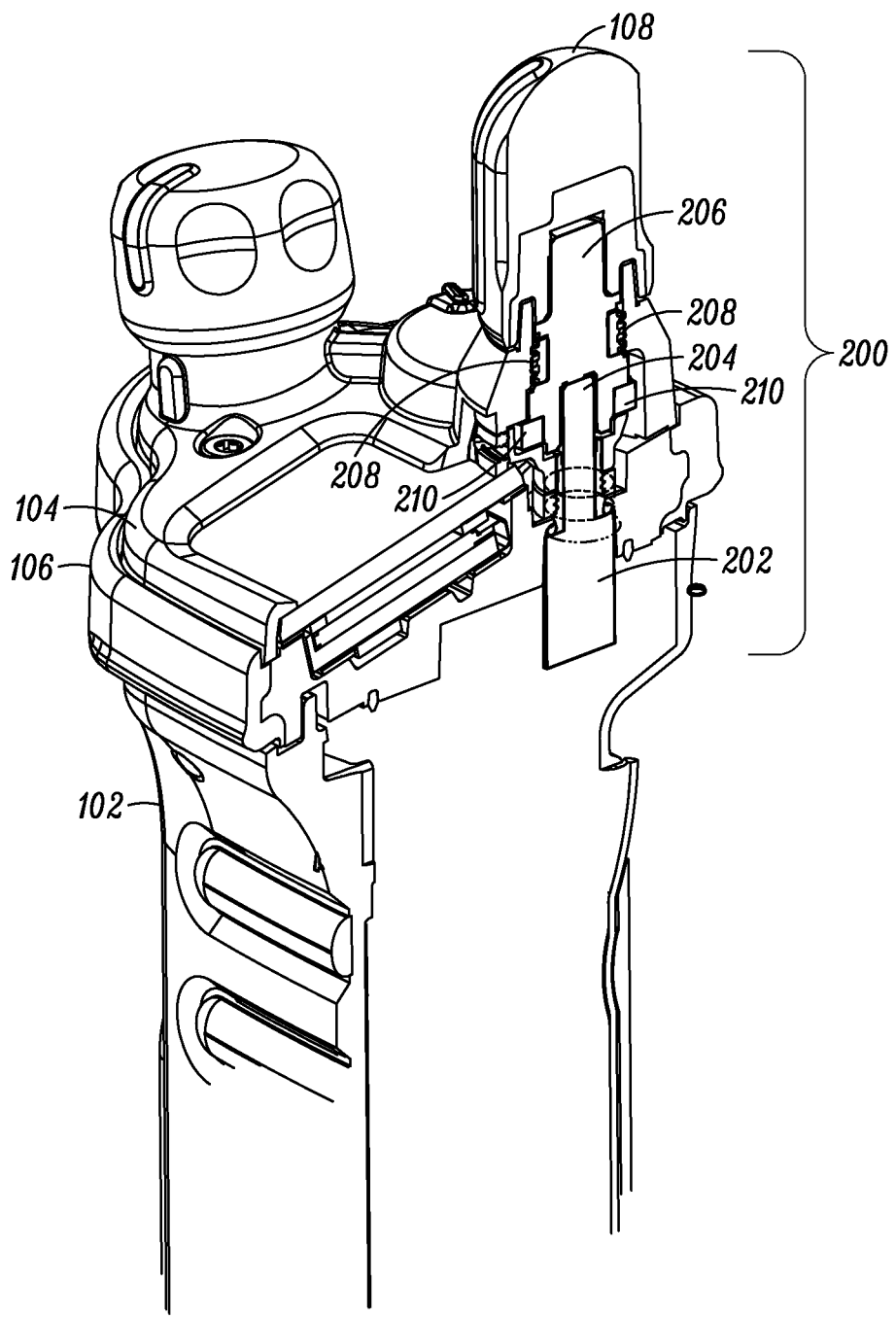
FIG. 2 is a cutaway and partially exploded view of the rotary control of FIG. 1 in accordance with an embodiment of the invention.

FIG. 2 is a cutaway the handheld radio 100. The rotary control includes a rotary switch control 202 having a shaft portion 204. This rotary switch control 202 with shaft 204 is preferably implemented using a standard off-the-shelf part, advantageously minimizing the need for customization. However, the disadvantage to using such as control is the minimal switching torque provided between positions. Unlike a vehicular radio where high switch torque may be achieved using a larger rotary switch control body containing larger moment arm springs, the rotary switch control for the handheld radio 100 utilizes a small body. However, creating the tactile feedback of clicks using the small off the shelf rotary switch control 202 presents significant design challenges, the primary being that of tight space constraints.

As an example for the ruggedized handheld radio 100, the desired off-the-shelf rotary switch control 202 has approximate potentiometer base dimensions of 8×9×9 mm size fitted within the housing 102, yet the control knob 108 provides a diameter of approximately 17 mm, as compared to standard (non-ruggedized) handheld radio which typically utilizes a control knob of approximately 10-12 mm diameter. Achieving sufficient torque for the larger control knob would normally require doubling the size of the rotary switch control (e.g. 16×18×18 mm) which is the approximate size used within a vehicular mobile radio which does not face the space constraints of the handheld radio. The assembly 200 formed in accordance with an embodiment of the invention addresses the issue of creating sufficient torque for a ruggedized radio having a large control knob 108 relative to the rotary switch control 202. As such, the control knob 108 may be more than double the size of the rotary switch control base.

Assembly 200 includes a shaft extender 206 coupled over the shaft 204, and a toothed gear element 210 coupled about the base of the shaft extender 206. A plurality of circular ribs 208 may also be coupled to the shaft extender 206 above the toothed gear element 210. In an embodiment of the invention, the shaft extender 206 is press fit over the shaft 204, the toothed gear element 210 is press fit about the base of the shaft extender 206, and the plurality of circular ribs 208 are stretched over the shaft extender 206 above the gear toothed component 210.

Assembly 200 further includes the control knob 108 having an opening within which is mounted the shaft extender 206. As such, the shaft extender 206 is internally mounted to and frictionally coupled to the control knob 108. The control knob 108, shaft extender 206 with toothed gear element 210, and rotary switch control 202 with shaft 204 are thus coupled together to form the assembly 200. Rotation of the control knob 108 causes rotation of the shaft extender 206 with toothed gear element 210 and rotation of the shaft 204 for engaging the potentiometer of the base of the rotary switch control 202 Assembly 200 further includes a ball plunger 302 shown and described in FIG. 3. Assembly 200 provides high torque tactile feedback. The top bezel 104 and bottom bezel 106 have apertures and recessed portions formed therein within which to mount the assembly 200. Again, the control knob 108 is very large relative to the size of the rotary switch control 202. Indeed, an advantage of the assembly 200 is the improved tactile feedback being provided for the large control knob 108 relative to the small size of the rotary switch control 202.

Figure 3:
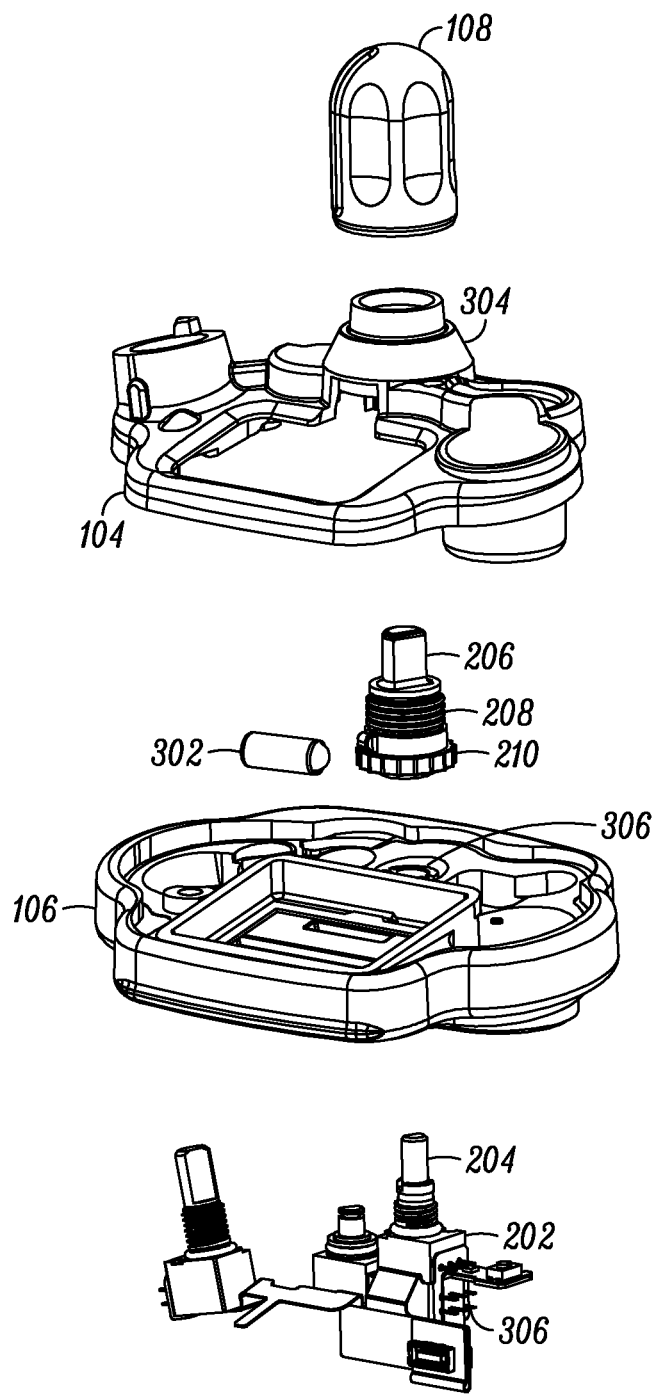
FIG. 3 is an exploded view of the rotary control in accordance with an embodiment of the invention.

FIG. 3 shows an exploded view of the assembly 200. This view shows the ball plunger 302. The top and bottom bezels 104, 106 provide molded apertures, recessed portions and slots within which to mount assembly 200. Top bezel 104 includes aperture with sleeve 304 formed therein for receiving the shaft extender 206. A slot 402 (shown in FIG. 4) is also formed in the top bezel 104 for receiving the ball plunger 302. Bottom bezel 106 provides a though hole 306 for receiving the shaft 204. The top bezel 104 may be formed of a rigid plastic material, while the bottom bezel 106 is preferably formed of aluminum. The top and bottom bezel are coupled together to provide a rigid top portion to the handheld radio 100. The rotary switch control 202 mounts to the bottom of the bottom bezel 106 while the shaft portion 204 is insertable and extends through the through hole 306. As seen in this view the shaft extender 206 includes circular ribs 208 and toothed gear element 210 which will sit above through hole 306 and within aperture/sleeve 304. The shaft extender 206 can formed of such material as glass filled plastic or other suitable rigid material. The circular ribs 208 may be formed of silicon or other compliant material that will stretch mount to the shaft extender 206. The circular ribs 208 provide increased resistance between the control knob 108 and the shaft extender 206. A ball plunger 302 is held between the top bezel 104 and bottom bezel 106 such that the ball plunger can load/push against the toothed gear element 210. The ball plunger is formed of a spring loaded ball bearing of stainless steel or other suitable metal. The toothed gear element 210 is formed of a metal material, such as stainless steel. The control knob 108 mounts to the shaft extender 206 and sleeved aperture 304 of top bezel 104. The control knob may be formed of plastic, overmolded silicon or other suitable ruggedized material.

Figure 4:
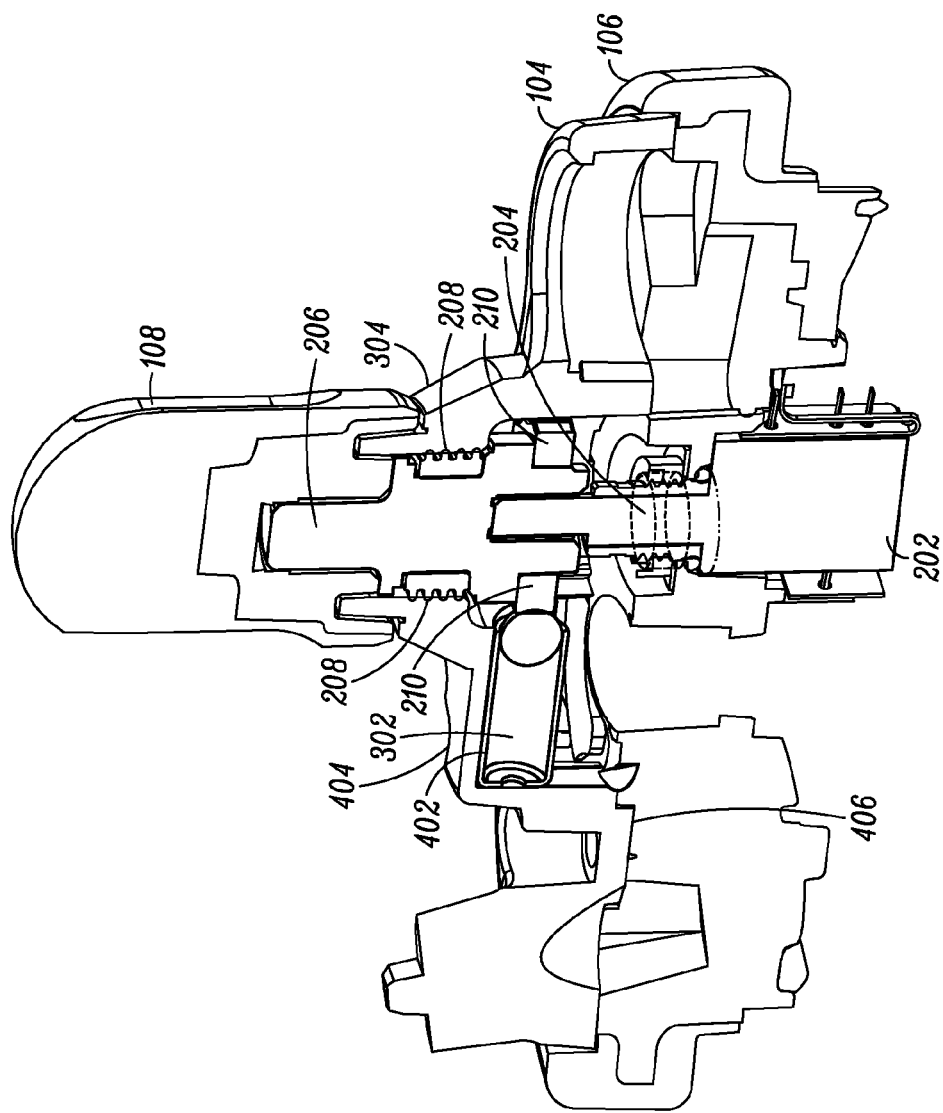
FIG. 4 is another cutaway view of the rotary control in accordance with an embodiment of the invention.

FIG. 4 shows another cross sectional cutaway view of the assembly 200. This view shows the ball plunger 302 pushing against the toothed gear element 210 of the shaft extender 206. In an example for the handheld radio 100, the ball plunger measures approximate 4.8 mm diameter by 13 mm in length. The top bezel 104 is an integrally molded piece part having a variety of planes over upper and lower surfaces 404, 406, the upper surface 404 providing the sleeved aperture 304 and the lower surface 406 having a slot 402 formed therein for receiving the ball plunger 302. The ball plunger 302 is retained in position within slot 402 between the top bezel 104 and the bottom bezel 106. As such an increase in the torque is created via the combination of ball plunger 302, toothed gear element 210 within limited space constraints. The circular ribs 208 create further resistance as the control knob 108 is turned by a user. Clicks from the rotary switch control 202 may even be muted but the additional tactile feedback in the form of clicks provided by the ball plunger 302 and toothed gear element 210 provides sufficient tactile feedback in the form of clicks. Hence, even a gloved user rotating the control knob 108 will sense the clicking response as the ball plunger 302 loads pushes against the toothed gear element 210.

Figure 5:
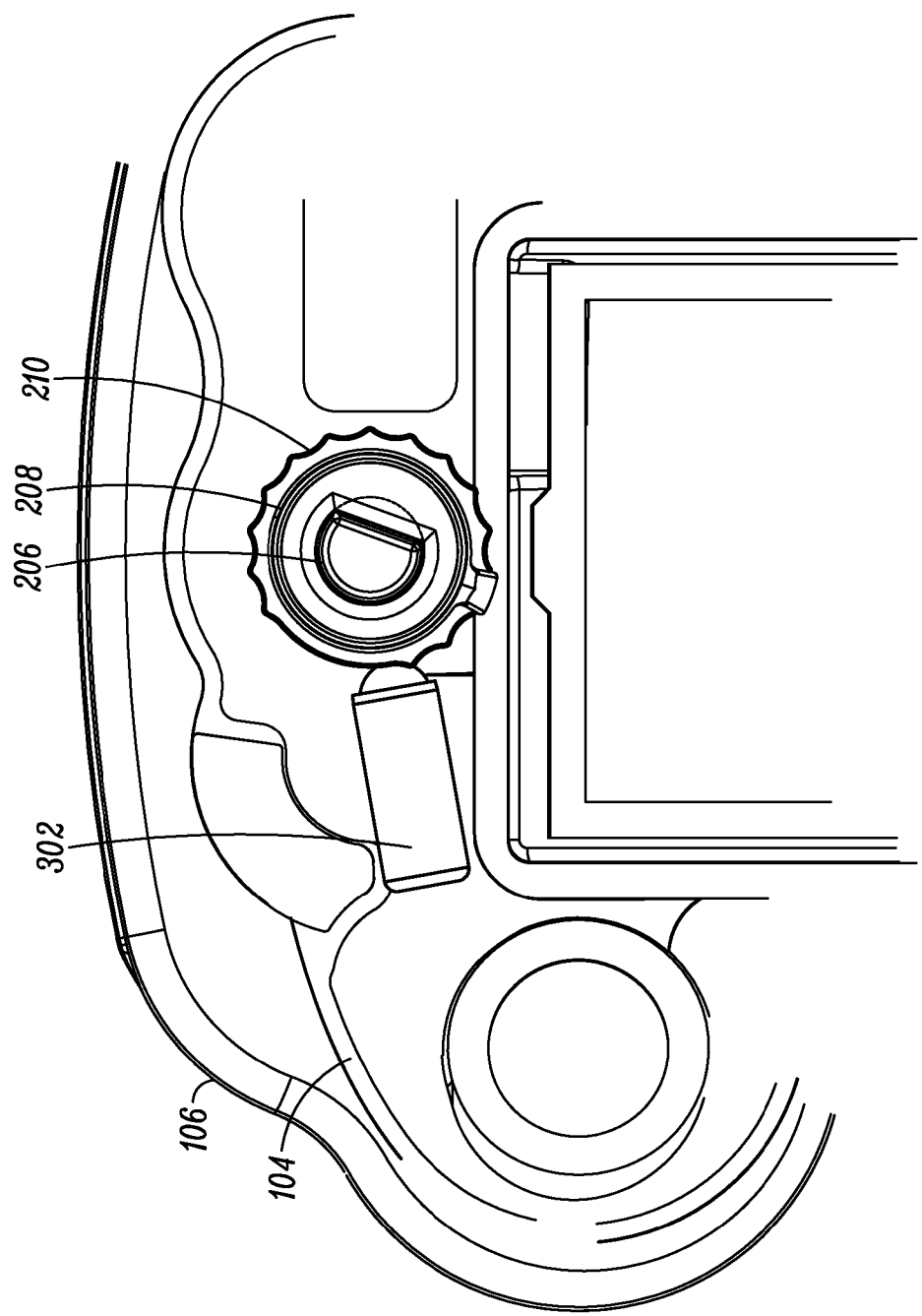
FIG. 5 is a top view cutaway view of the rotary control in accordance with an embodiment of the invention.

FIG. 5 is a top view of the ball plunger 302 and toothed gear element 210 with the top bezel 104 removed. In this view the slot 402, which retains the ball plunger 302, is no longer visible as only the bottom bezel 106 is shown. This view is provided to show the ball plunger 302 making contact by pushing against the toothed gear element 210. The load of the ball plunger 302 against the toothed gear element 210 significantly increases the switching torque between clicks. The shaft extender 206 with circular ribs 208 and toothed gear element 210 form a structure with which the ball plunger 302 operates to provide the improved tactile feedback to the user. As such, even a standard rotary switch control 202 with minimal switching torque between positions can be used in conjunction with the assembly.

Accordingly, there has been provided a rotary control with increased torque within tight space constraints within a handheld radio. The rotary control formed in accordance with the various embodiments provides significant advantages over a standard rotary switch. The completed control switch assembly 200 will not inadvertently turn and provides significantly higher torque clicks than those of the rotary switch control 202 alone. Testing has demonstrated that a radio incorporating the assembly 200 meets a thirty thousand life cycles testing parameter. In fact, a rotary switch control that has no tactile clicking feedback could also be used within the assembly to further reduce cost if desired. Gloved users are now able to sense the improved tactile clicking feedback provided by the rotary control assembly formed in accordance with the various embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A rotary control assembly for a handheld radio, comprising:
 a housing;
 a top bezel having a sleeved aperture, a recessed portion and a slot integrally formed therein;
 a bottom bezel having a through hole aligning with the sleeved aperture;
 an off-the-shelf rotary switch control having a base and a shaft extending from the base, the base being coupled below the through hole of the bottom bezel while the shaft protrudes through the through hole;
 a shaft extender coupled to the shaft of the rotary switch control above the through hole, the shaft extender having a toothed gear element, the shaft extender protruding through the sleeved aperture of the top bezel while the toothed gear element is captured by the recessed portion of the top bezel
 a control knob mounted over the shaft extender;
 a ball plunger fitted within the slot of the top bezel such that the ball plunger makes contact with the toothed gear element, and
 wherein the control knob controls turning the shaft extender, the shaft extender controls turning the toothed gear element and the shaft, the toothed gear element making contact with the ball plunger thereby generating a clicking tactile feedback in response to the control knob being turned.

2. The rotary control of claim 1, wherein the top bezel is an integrally molded piece part having upper and lower surfaces, the upper surface providing the sleeved aperture and the lower surface having the slot formed therein for receiving the ball plunger, the ball plunger being retained in position between the top bezel and the bottom bezel within the slot.

3. The rotary control of claim 2, wherein the shaft extender includes circular ribs providing additional resistance between the shaft extender and the control knob.

4. The rotary control of claim 3, wherein the control knob is approximately double the size of the rotary switch control.

5. The rotary control of claim 4, wherein the control knob has a diameter sufficiently wide for gloved use.

6. The rotary control of claim 5, wherein the clicking tactile feedback is provided by the toothed gear element and ball plunger while the rotary switch control is substantially muted.

7. An assembly for a rotary control switch, comprising:
 a housing;
 a control knob coupled to the housing;
 a rotary switch control having a shaft;
 a shaft extender coupled to the shaft of the rotary switch control, the shaft extender being internally mounted to and frictionally coupled to the control knob such that rotation of the control knob causes rotation of the shaft extender and rotation of the shaft;
 a toothed gear element coupled to the shaft extender, the toothed gear element rotating in conjunction with rotation of the shaft extender; and
 a ball plunger mounted within the housing, the ball plunger loading the toothed gear element, the ball plunger and toothed gear element providing a clicking tactile feedback in response to rotations of the control knob.

8. The assembly of claim 7, wherein the ball plunger loading the toothed gear element provides an increase in torque over that which is provided by the rotary switch control alone.

9. The handheld radio of claim 7, wherein the rotary switch is muted.

10. The handheld radio of claim 7, wherein the control knob has a diameter of approximately 17 mm and the rotary switch control has a base of approximately 8×9×9 mm.

11. The handheld radio of claim 7, wherein control knob comprises a frequency control knob.

12. The handheld radio of claim 7, wherein the handheld radio comprises a two-way handheld radio.

13. A handheld radio, comprising:
 a radio housing;
 a top bezel and a bottom bezel coupled to a top portion of the radio housing, the top bezel having upper and lower surfaces with integrally molded surfaces including a sleeved aperture extending from the upper surface and a slot molded into the lower surface;
 a control knob for coupling to the sleeved aperture, the control knob including an opening;

an off-the-shelf rotary switch control having a potentiometer base with a shaft extending therefrom;
a shaft extender for coupling to the shaft of the rotary switch control, the shaft extender being insertable within the opening of the control knob and having a base with a toothed gear element coupled thereto; and
a ball plunger for inserting within the slot of the lower surface of the top bezel, the ball plunger aligned with the toothed gear element o as to generate clicks in response to the control knob being turned.

14. The handheld radio of claim 13, further comprising:
circular ribs formed on the shaft extender above the toothed gear element, the circular ribs providing additional friction between the control knob and the shaft extender during rotation of the control knob.

15. The handheld radio of claim 14, wherein the control knob is a molded piece part suitable for gloved rotation.

16. The handheld radio of claim 14, wherein the control knob is more than double the size of a base of the rotary switch control.

\* \* \* \* \*